July 27, 1926.
H. P. ARNT
1,594,189
TUBULAR SPOKE AND METHOD OF MAKING THE SAME
Filed April 11, 1923   3 Sheets-Sheet 1
FIG I.
FIG. II.
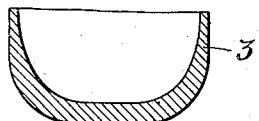
FIG. III.
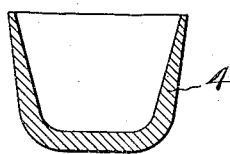
FIG. IV.
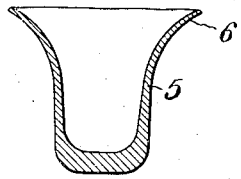
FIG. V.
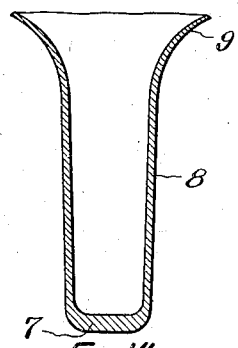
FIG. VI.
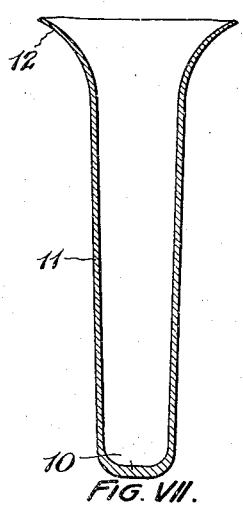
FIG. VII.
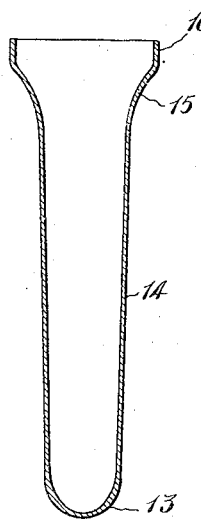
FIG. VIII.
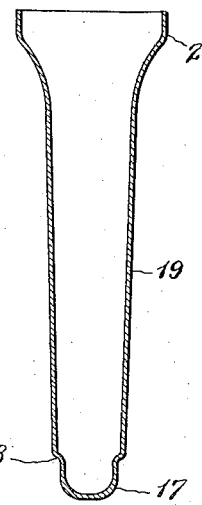
FIG. IX.
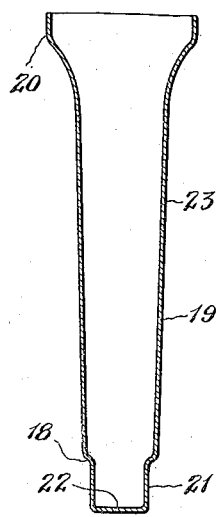
FIG. X.
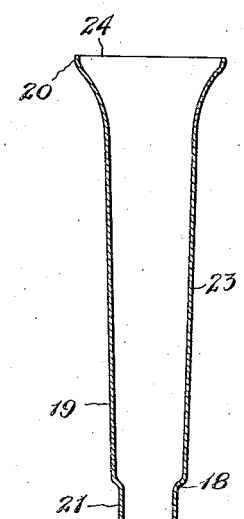
FIG. XI.
INVENTOR
HERALD P. ARNT
By his atty July 27, 1926.
H. P. ARNT
1,594,189
TUBULAR SPOKE AND METHOD OF MAKING THE SAME
Filed April 11, 1923     3 Sheets-Sheet 2
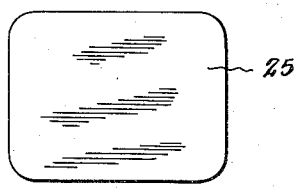
FIG. XII.
FIG. XIII.
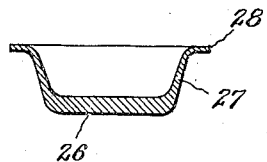
FIG. XIV.
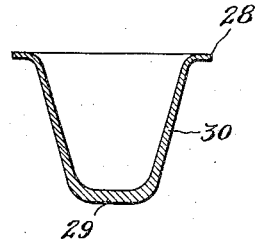
FIG. XV.
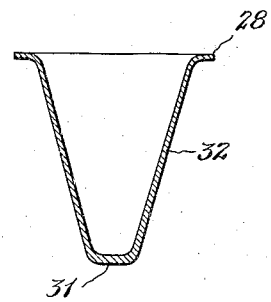
FIG. XVI.
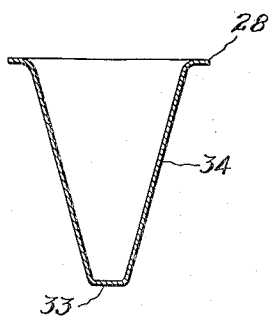
FIG. XVII.
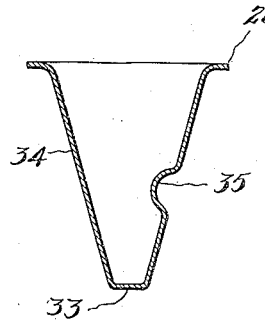
FIG. XVIII.
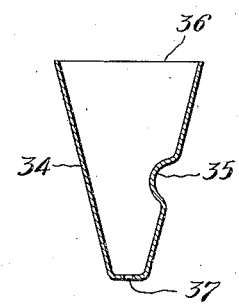
FIG. XIX.
INVENTOR:
HERALD P. ARNT
By his atty.

July 27, 1926.
H. P. ARNT
1,594,189
TUBULAR SPOKE AND METHOD OF MAKING THE SAME
Filed April 11, 1923    3 Sheets-Sheet 3
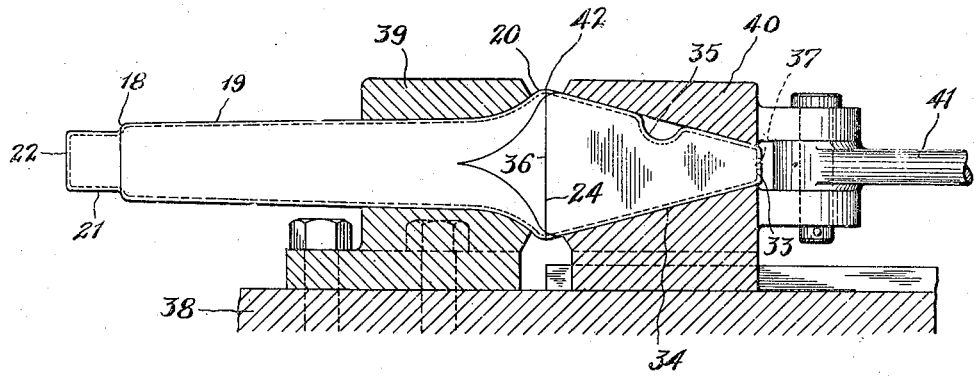
FIG. XX.
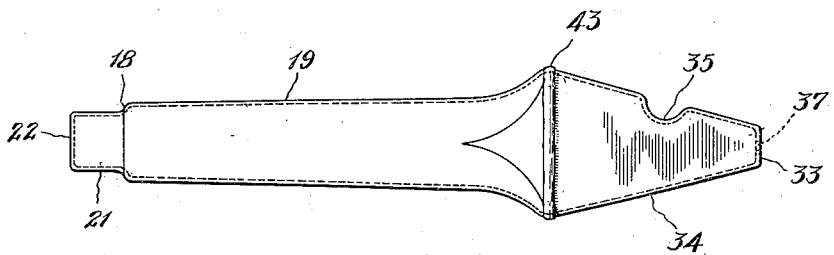
FIG. XXI
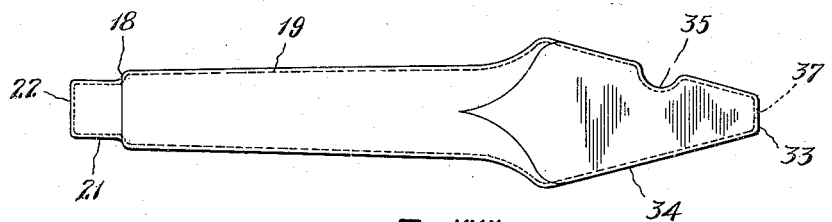
FIG. XXII.
INVENTOR
HERALD P. ARNT
By his atty.

Patented July 27, 1926.

1,594,189

UNITED STATES PATENT OFFICE.

HERALD P. ARNT, OF LAKEWOOD, OHIO, ASSIGNOR OF ONE-FOURTH TO CURT B. MULLER, OF CLEVELAND, OHIO.

TUBULAR SPOKE AND METHOD OF MAKING THE SAME.

Application filed April 11, 1923. Serial No. 631,326.

My invention relates to the method of making a tubular spoke and more particularly the method of making a wheel spoke of two complemental separately drawn parts adapted to be welded end to end.

I am well aware that a great variety of tubular parts have been drawn and doubtless welded together in many ways, but believe I am the first to have developed a feasible method of so constructing a tubular wheel spoke. Tubular wheel spokes are old, and when composed of more than one piece of metal were commonly attached or welded along a line or lines running longitudinally of the spoke. Any form of lock seam connection if strong enough is expensive of manufacture, even welding is a considerable factor of expense so that to the extent to which the welding operation can be reduced a proportionate saving may be realized. Accordingly, I propose drawing the major portion including the outer end of a spoke as one piece and likewise drawing the inner or nave end of the spoke as a single complemental piece. The drawings exemplify the nave end of keystone formation and the junction line at a shoulder formed at the larger end of the nave piece, while the outer smaller end of the other spoke piece is to be left closed for the purpose of supplying added strength when attached to a felloe.

Adverting to the drawings, in which sheet 1 illustrates the successive steps of drawing the outer end of the spoke, sheet 2 illustrates the successive steps of drawing the nave end of the spoke and sheet 3 illustrates a welding mechanism together with the spoke parts as first attached and in finished form.

Figures I and II are a plan and an end view respectively of a drawing steel blank.

Figures III to XI inclusive show in sequential order the successive steps according to which the blank may be drawn to the desired form.

Figures XII and XIII are a plan view and a side view respectively of a drawing steel blank somewhat thinner suited to enable protection of the nave end of the spoke.

Figures XIV to XIX inclusive show in sequential order a series of steps according to which the blank evolves to the desired shape.

Figure XX is a side view partly in section of the essential parts (jaws and operating link) of a welding machine.

Figure XXI is an elevation of the two spoke parts at the completion of the welding operation.

Figure XXII is a view corresponding to Figure XXI showing the welding scar ground off.

A drawing steel blank 1 shown in Figures I and II may first have imparted to it a shape shown in Figure III to comprise a curved bottom 2 and raised side 3 to be of cup-shaped or concavo-convex form. It should be understood that the several views showing the sequential drawing steps are not necessarily all the result of distinct drawing operations, the seven shown on sheet 1 and the six shown on sheet 2 being merely arbitrarily selected to disclose the evolution. Next the blank is further drawn so that the walls 4 become lengthened as shown in Figure IV thereafter the dimension of the closed end is constricted as shown in Figure V from which rise still thinner walls 5 with a flared mouth 6. Next, the closed end 7 is further thinned and constricted owing to the drawing out of the walls 8 which terminate in a flared extremity 9. Thereafter a similar progression of the drawing operation causes the blank to assume the shape shown in Figure VII with the bottom 10, walls 11 and flared end 12. In Figure VIII the closed end of the blank is curved at 13 and has an interjacent section 14 merging with a flare 15 which terminates in a straightened or near cylindrical section 16. Then the blank may be considered to have imparted to it the indented closed end 17 merging at a shoulder 18 with the main tubular section or body portion 19 terminating at 20. Figure X shows the closed end 21 having its end wall 22 again squared while the main tubular portion 23 remains of substantially the same shape preparatory to having its open end cut off around a line 24 as appears in the finished outer spoke section illustrated in Figure XI.

Directing attention to sheet 2, which contains Figures XII to XIX inclusive, a blank 25 is first drawn to the shape of a shallow cup having a bottom 26, sides 27 which terminate in a lip flange 28. Next the blank is progressively drawn further so as to thin the bottom 29 and lengthen the sides 30 as shown in Figure XV, then to further thin the bottom 31 and incidentally reduce its area besides further lengthening the sides 32 as appears in Figure XVI. Thereafter, a corresponding evolution occurs to obtain the smaller and thinner bottom or end wall 33 and longer and thinner sides 34 as appears in Figure XVII. A semi-cylindrical indentation 35 may next be imparted as shown in Figure XVIII, following which the open end flange 28 is cut off at 35 and the closed end 33 has a hole 37 punched out to serve the purpose of a vent during the welding operation to be next explained.

Inasmuch as nothing is claimed for the method of welding only the essential parts of any standard electric but welding type of welding machine has been illustrated in Figure XX, where is shown a fixture 38 carrying a fixed jaw 39 with an internal contour complemental to the exterior of the spoke section 19 near its open end and a movable jaw 40 actuated by an operating link 41 so as to firmly grasp the side walls 34 of the nave end section and cause its larger end along the line 36 to abut and conform to the line 24 preparatory to throwing on the current and effecting a weld at 42 causing the weld burr 43 which is shown in Figure XXI. Finally, the exterior portion of the burr 43 may be ground off as appears in the finished spoke seen in Figure XXII.

I claim:—

1. As a new article of manufacture, a spoke composed of two integrally drawn and welded tubular end sections, one section being of frustro-wedge shaped formation and the open end of the other flared so that its edge conforms to the open end of the frustro-wedge shaped section.

2. As a new article of manufacture, a spoke comprising two end sections integrally drawn of sheet metal and said two end sections being each of tubular form with crosswise abutting edges electrically welded together, one section being of key-stone formation and the free end of the other section being closed.

3. As a new article of manufacture, a spoke integrally formed of sheet metal and composed of an elongated tubular body section and including an end wall and a flat sided nave end section also of tubular form an including an end wall the other pair of ends abutting and welded together end to end and in a plane substantially parallel to the planes of said end walls.

4. The method of making a tubular wheel spoke which consists in shaping integral tubular pieces each provided with an end wall and then welding together the open ends of said pieces in a direction around the spoke.

5. The method of making a tubular wheel spoke which consists in drawing hollow opposite end pieces and then electrically welding them together end to end along continuous abutting edges around the spoke.

6. As a new article of manufacture a spoke including two sections welded end to end and one comprising a closed end constantly integral.

7. The method of making a tubular metal spoke which consists in progressively drawing out two blanks to tubular form whereby each has a constantly integral end wall and then welding together the open ends of the two tubes.

8. As a new article of manufacture, a wheel spoke integrally formed of metal and composed of two complementary seamless end sections each cup-shaped with conforming edges welded together, one section being frusto-wedge shaped with one pair of substantially parallel frusto-wedge shaped walls and another pair of walls diverging toward the weld line, the other section being defined by a generated surface, and the weld line extending around the spoke axis.

9. As a new article of manufacture, a wheel spoke integrally formed of metal and composed of two complementary seamless end sections each cup-shaped with conforming edges weldes together, each section having its remote end closed, one section being frusto-wedge shaped with one pair of substantially parallel frusto-wedge shaped walls and another pair of walls converging toward its closed end from the weld line, the other section being defined by a conical surface and by a cylindrical surface, and the weld line being in the cross-sectional plane of greatest area.

10. The hereinbefore described process of forming a spoke from sheet metal having a hollow frustro-wedge shaped nave end and a body portion provided with an axial bore closed at one end and opening at its other end into the nave end, the body portion being mainly of less diameter and of greater length than the nave end, while having one edge conforming in size and shape to one edge of the nave end, consisting in the following steps; (1) drawing a pair of blanks into cup-shaped shells; (2) elongating and reducing the diameter of one shell to the maximum diameter of the finished article; (3) elongating and reducing the diameter of the other shell to the desired frustro-wedge shaped form; and (4) welding together the complemental edge sections of the nave end and of the body portion.

11. The hereinbefore described process of forming a spoke from sheet metal having a hollow frustro-wedge shaped nave end and a body portion provided with an axial bore closed at one end and opening at its other end into the nave end, the body portion being mainly of less diameter and of greater length than the nave end, while having one polygonal edge conforming in size and shape to a corresponding polygonal edge of the nave end, consisting in the following steps; (1) drawing a pair of blanks into cup-shaped shells; (2) elongating and reducing the diameter of one shell to the maximum diameter of the finished article; (3) elongating and reducing the diameter of the other shell to the desired frust-wedge shaped form; (4) providing a venting aperture in an end of one of the parts; and (5) welding together the complemental polygonal edge sections of the nave end and of the body portion.

Signed by me, this 10th day of March, 1923.

HERALD P. ARNT.

UNITED STATES PATENT AND TRADEMARK OFFICE
CERTIFICATE OF CORRECTION

PATENT NO. : 4,594,189
DATED : Jun. 10, 1986
INVENTOR(S) : Young S. Lo, et al

It is certified that error appears in the above-identified patent and that said Letters Patent are hereby corrected as shown below:

Col. 2, line 39, change "antidepressant" to read --anticonvulsant--

Signed and Sealed this

Third Day of March, 1987

Attest:

DONALD J. QUIGG

Attesting Officer

Commissioner of Patents and Trademarks